Oct. 22, 1940.  J. M. HALL ET AL  2,218,530
CHANGE SPEED MECHANISM
Filed Jan. 21, 1937  3 Sheets-Sheet 3

Inventors
Joseph M. Hall
Herbert E. Tucker

Patented Oct. 22, 1940

2,218,530

UNITED STATES PATENT OFFICE 2,218,530

CHANGE SPEED MECHANISM

Joseph M. Hall and Herbert E. Tucker, Chicago, Ill.

Application January 21, 1937, Serial No. 121,387

28 Claims. (Cl. 74—336)

This invention relates to change speed mechanism and more particularly to the automatic type of a change speed device.

One of the objects of the invention is the provision of a new and improved change speed mechanism having novel means for insuring the release of the clutch mechanism for a predetermined range of speed before the setting of the clutch for the next higher or lower range of speed.

Another object of the invention is the provision of a new and improved clutch mechanism for change speed devices.

A further object of the invention is the provision of a new and improved automatic change speed mechanism that may be easily and readily adapted to the conventional change speed gearing.

Another object of the invention is the provision of a new and improved automatic change speed mechanism that is provided with novel means for insuring a prompt and abrupt change in such mechanism when the speed of the drive shaft is increased or decreased a predetermined amount.

A further object of the invention is the provision of a new and improved change speed mechanism that is simple in construction, inexpensive to manufacture, that is especially adapted for use in connection with a large portion of the conventional change speed mechanism, and that is efficient in use and may be readily installed.

Other and further objects and advantages of the invention will appear from the following description taken in connection with the accompanying drawings, in which—

Referring now to the drawings, the reference character 10 designates a portion of a motor vehicle having a flywheel housing 11 and a gear casing 12. Mounted within the housing 11 is what may be termed a flywheel assembly 13 to which the drive shaft 14 is rigidly attached in any suitable manner as by means of the bolts 15. The flywheel assembly comprises the flywheel plate 16 to which is rigidly secured a casing 17 having a plurality of annular shoulders 18, 19, 21 and 22, respectively, see Fig. 2. The diameters of these annular shoulders may be, and preferably are, progressively smaller toward, what for convenience will be termed, the rear, and are adapted to form seats or abutments for disk clutch members, as will presently appear.

Figures 2, 5, 6:
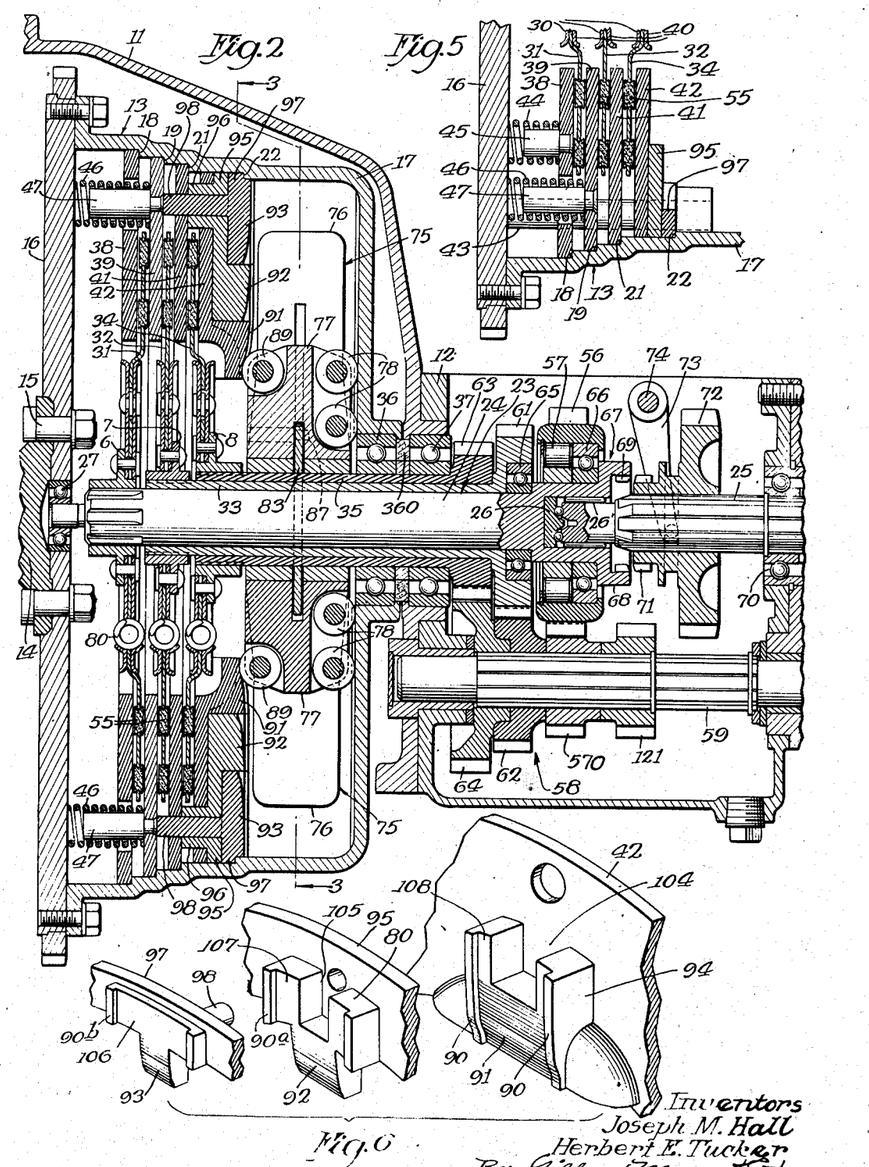
Fig. 2 is a vertical section of the structure shown in Fig. 1, with parts broken away.
Fig. 5 is a section on the line 5—5 of Fig. 3.
Fig. 6 is an exploded view of the cams and associated rings, with parts broken away.

A driven shaft designated generally by the reference character 23 extends into said housing 11 in alignment with the drive shaft 14, as clearly shown in Fig. 2 of the drawings. The driven shaft 23 is in two sections, a forward section 24 and a rear section 25. The rear section 25 may be provided at its rear end with a coupler flange 9 to which the universal joint is adapted to be attached as is usual in such constructions. The forward end of the driven shaft section 25 extends into the rear end of the forward section 24 and is provided with a thrust bearing 26, Fig. 2, and also with an anti-friction bearing 26¹. The forward end of the shaft section 24 is journaled in the plate 16 by suitable anti-friction bearings as shown at 27 in Fig. 2.

Clutch mechanism is provided for obtaining different speed ratios between the driving and driven shafts. This mechanism, together with the associated gears which are permanently in mesh, constitute the change speed device whereby different speed ratios are obtained between the driving and driven shafts. This clutch mechanism is of the usual or any well known plate type of clutch, that is, the type wherein one plate or friction disk is clamped between two other plates for constituting a driving connection between the driving and driven shafts. This clutch mechanism is mounted in the casing 13 and comprises a plurality of intercalated friction members; one set, which for convenience of description will be termed the driving set, is connected to the driving elements or power shaft of the motor and the other or driven set is connected to the driven elements, thereof.

Figure 8:
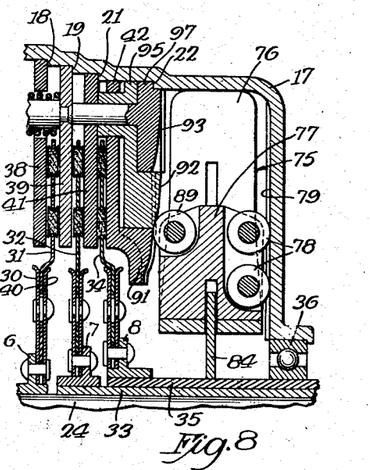
Figs. 8, 9 and 10 are sections through the clutch and control mechanism showing the position of the parts in low, intermediate and high speed, respectively.

The inner or driven set of friction members comprises the forward friction disk 31 which is connected to the shaft section 24 at its forward end; an intermediate friction disk member 32 which is connected to a sleeve or auxiliary driven shaft 33 rotatably mounted on the forward section 24 of the driven shaft 23; and a rear friction disk 34 which is rigidly connected to a sleeve or auxiliary driven shaft 35 rotatably mounted on the sleeve 33. The clutch members 31, 32 and 34 are connected to flanges 6, 7 and 8 on the shaft section 24 and sleeves 33 and 35, respectively, each through a set of intermediary or driving plates 30 and 40, see Fig. 8. These plates are connected to the corresponding flanges 6, 7 and 8 by rivets and receive the friction disks between them. The disks are loosely connected to the plates 30 and 40 between which they extend by springs 80 in the conventional manner; that is, the helical springs are secured in alined slots in the friction disk and driving plates as shown in Fig. 2 so that in driving in either direction the disks will tend to compress the springs. These springs permit a slight yielding movement of the friction disk relative to the plates 30 and 40 which will permit a smooth clutch action and eliminate chattering when the clutch is thrown in operation. Since this resilient connection is old in the art, it need not here be further illustrated or described.

Suitable roller bearings 36 and 37 are interposed between the sleeve 35 and the casing 13 and the housing 11, respectively. A ring 360 of suitable material for forming an oil seal is inserted between the bearings 36 and 37, Fig. 2. The outer or driving set of friction elements comprises the friction plates 38, 39, 41 and 42 which are connected to the flywheel plate 16 and casing 17 in any suitable manner as by means of pins 43, see Figs. 3 and 4.

Figure 3:
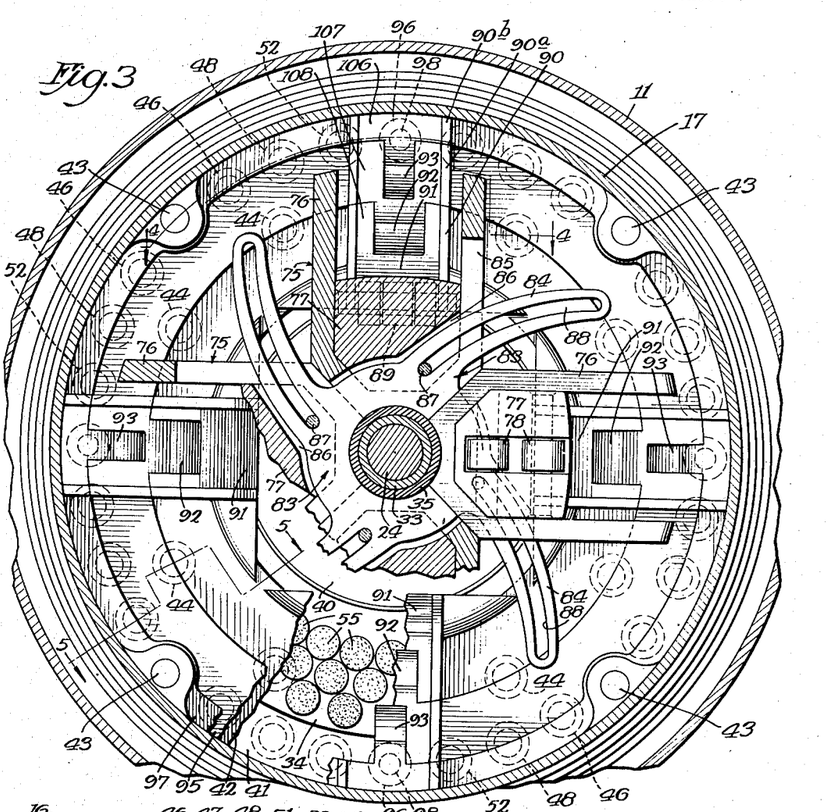
Fig. 3 is a section on the line 3—3 of Fig. 2.
Figure 4:
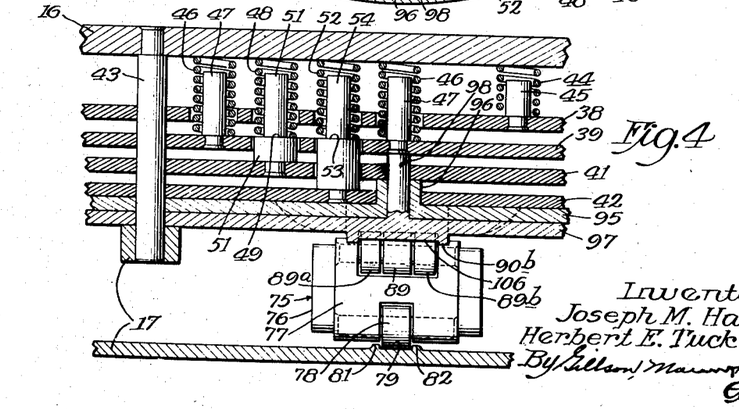
Fig. 4 is a section on the line 4—4 of Fig. 3.

Suitable means are provided for resiliently forcing the friction plates 38, 39, 41 and 42 toward the right, Fig. 2, against the shoulders or abutments 18, 19, 21 and 22. As shown, four sets of springs, one set for each friction plate, are employed for this purpose. The friction plate 38 is forced rearwardly against the shoulder 18 by a plurality of springs 44 which are positioned by studs 45 rigidly connected to said disks as shown in Figs. 3, 4, and 5. The plate 39 is held against the shoulder 19 by a plurality of springs 46 positioned by studs 47 rigidly attached to the plate 39 and the plate 41 is held against the shoulder 21 by springs 48 which surround studs 51 and engage shoulders 49 thereon, said studs 51 being rigidly secured to the plate 41. Likewise, the plate 42 is held rearwardly by springs 52 engaging shoulders 53 on studs 54 rigidly connected to said plate. The plate 42 does not directly engage the shoulder 22, but this shoulder does limit its rearward movement as will presently appear. By providing shoulders on the spring positioning pins, the springs of the rearmost plates may be of substantially the same length as the springs 46 and 48. The shoulders 18, 19, 21 and 22 limit the rearward movement of the plates and the parts are so constructed that when the plates are seated against the shoulders or are at their rearmost position, the clutch members are inoperative. The clutch or disk friction members 31, 32 and 34 are of the conventional type and are provided with suitable inserts of friction material 55 for increasing the friction as is well known in the art. Since the details of the construction of these clutch plates constitute no part of the present invention, it is not thought necessary to further illustrate or describe the same.

Suitable gearing mechanism is provided for driving the driven shaft from the driving shaft at different speed ratios when the driving is through the different friction disks 31, 32 and 34. The gearing for this mechanism is substantially the same construction as the conventional change speed mechanism for motor vehicles except the gears are permanently in mesh and an overrunning clutch is provided. As shown, the section 24 of the driven shaft 23, which is rigidly connected to and turns with the friction disk 31, is provided on its rear end with a spur gear 56 which is connected thereto by an overrunning clutch 57 of the usual or any well-known construction. This clutch is inoperative only when the device is in high, neutral or reverse as when the shaft section 24 overruns the gear. The gear 56 is in permanent mesh with the gear 570 of the gear cluster 58 which in turn is keyed to a counter shaft 59 extending parallel with the driven shaft 23. The sleeve 33, which is rigidly connected to and turned by the friction disk 32, is provided on its rearward end with a gear 61 which is in permanent mesh with the intermediate gear 62 of the gear cluster 58; and the sleeve 35, which is rigidly connected to and is turned by the friction disk 34, is provided at its rear end with a gear 63 which is in permanent mesh with the forward gear 64 of the gear cluster 58.

Suitable anti-friction bearings are provided for these sleeves. The outer sleeve 35 is provided with the anti-friction bearings 36 and 37 and the sleeve 33 is provided with anti-friction bearings 65. The gear 56 is provided with anti-friction bearings 66. The shaft section 25 is likewise provided with the usual antifriction bearing 70 in the rear wall of the gear case 12. The rear portion of the shaft section 25 is provided with a speedometer drive gear 50 and with a coupler flange 9, all of which are of the usual or any well known construction.

Suitable means are provided for forcing the friction disks 39, 41 or 42 forwardly for rendering the clutch operative. In the form of the construction selected to illustrate one embodiment of the invention, speed sensitive mechanism is employed for this purpose. As shown, a plurality of radially movable weights are employed. The parts are so constructed that as the weights are forced outwardly by centrifugal force, the clutch will be rendered operative to drive the driven shaft at three different speed ratios forwardly and two reverse.

A conventional clutch 67 is provided for connecting the two sections 24 and 25 of the driven shaft together. As shown, the rear end of the shaft section 24 is provided with an enlarged end 68 having internal clutch teeth 69 which are adapted to be engaged by clutch teeth 71 carried by a hub on the gear 72. The gear 72 is non-rotatably connected to the shaft section 25 and is slidable along the same. A clutch fork 73, mounted on a rock shaft 74, is provided for moving the clutch member 71 into and out of engagement with the complementary clutch member 68. The shaft 74 is adapted to be operated in the usual manner.

In the operation of the device, when the clutch 67 is engaged and the clutch plates are operated to cause the clutch disk 34, for instance, to turn with the driving shaft, the drive will be through the gears 63, 64, 57 and 56 for causing the driven shaft to rotate at its lower speed. For obtaining high speed, the clutch is operated to drive through the friction disk 31, which drives the driven shaft directly at high speed, the overrunning clutch 57 permitting such action without rotating the gear cluster 58.

Suitable means are provided for automatically shifting the clutch mechanism for obtaining different predetermined speed ratios by driving through the different driven or friction disks 31, 32 or 34. In the form of the device selected to illustrate one embodiment of the invention, centrifugally operated weight members engaging cam elements carried by the friction disks are employed for this purpose. In the form shown, four weight members 75 are used. These weights are located 90 degrees apart and are arranged to move radially of the flywheel assembly 13. They are forced outwardly by centrifugal force and inwardly by spring pressed cams as will presently appear. Each weight member 75 comprises two portions or sections, an inner section 77, see Fig. 3, and an outer U-shaped section, 76 slidably mounted on the inner section. The inner ends of both sections are tapered so that they will nest about and adjacent to the sleeve 35 when in their innermost position, as shown in Fig. 3. The weights are made in two sections so that at low speeds, they will both be operative thereby insuring sufficient mass to operate the clutch for low speed. The outer sections 76 of the weights have such length that when the clutch is set for low speed, their outer ends will engage the outer wall of the flywheel assembly or housing 17, Figs. 8, 9 and 10, which will limit any further outward movement of the outer section. Intermediate and high speeds are controlled by the inner sections 77 alone, as will presently appear.

The outer sections of the weights are guided in their movement by the inner section and by a spider member 83, as will presently be described. The inner section of each weight is provided on its rear side with an anti-friction guide roller 78 which engages a track 79, Fig. 4, formed by ribs 81 and 82 on the housing 17.

In order that the weights shall all move simultaneously and to substantially the same extent, the spider 83, having slotted, arcuate arms 84, is employed. The arms 84 extend through slots 85 and 86, Fig. 3, in the inner ends of the weight sections 76 and 77, respectively. Each of the inner weight sections 77 is provided with a pin 87 which extends through the slot 88 in the corresponding arm 84. It will thus be seen that if one of the weights is forced outwardly, it will tend to rotate the spider, the arms of which extend at an angle to the radius and have arcuate slots, and this rotation will cause the remaining weights to move out in like manner.

The forward side of the inner weight section 77 is provided with a cam operating roller 89 and with track rollers 89a and 89b at the sides thereof. These rollers are coaxial. The cam roller 89 is adapted to engage cams 91, 92 and 93 for operating the clutch members 42, 41 and 39, respectively. These cams are radially spaced within the housing 17 and are associated with the friction plates 42, 41 and 39, respectively, for moving said plates forwardly into frictional engagement with the frictional disks 31, 32 and 34 when the speed of the driving members increases sufficiently to cause the weights to move outward by centrifugal force. These cam members and the corresponding friction plates are held rearwardly by the springs 44, 46, 48 and 52.

The inclined surfaces of the spring pressed cams 91, 92 and 93, operating against the cam roller 89, force the weights radially inwardly when the vehicle is at rest or when the speed of the driving member decreases. In other words, centrifugal force tends to move the weight outwardly and the spring pressed cams tend to force them inwardly. The direction of movement of the weights at any given time will be determined by which one of these forces predominates.

The rearmost friction plate 42 has a plurality of cam members 91, one for each weight, on its rear side. There are four of each of the cam members, 91, 92 and 93 and since the cams of each set are alike, only one of each set need be described. The upper portion of the cam 91 is bifurcated, the arms 94 of which form a slot 104 for receiving the lower portion of the cam 92, Fig. 6. The cam arms 94 have a cam surface or track 108 which is adapted to be engaged by the track rollers 89a and 89b of the weight section 77, as shown more clearly in Figs. 2 and 6 of the drawings. The track rollers 89a and 89b not only assist in guiding the weight in its movement and constitute anti-friction bearings for the weights but will also hold the preceding cam depressed while the cam roller is passing from one cam to the next adjacent one as the speed increases, as will presently appear. The track 108 has a flange 90 at each side thereof for guiding said rollers.

The cam 92 is mounted on a ring or annular member 95 and has its upper portion bifurcated similar to the cam 91 to form the arms 80 separated by the slot 105. The lower portion of this cam is adapted to engage in the open slot 104 of the cam 91 and the arms 80 of this bifurcation are provided with a track 107 similar to the track 108 of the cam 91 and is adapted to aline therewith. The arms are provided with flanges 90a on each arm which may be said to form a continuation of the flange 90 of the arms 94. The cam 92 or annular member 95, rather, has a forward, extended boss or stud 96 which is provided with an axial opening as shown more clearly in Fig. 2. This stud is adapted to engage the clutch plate 41 for moving the same forwardly against the pressure of the springs 48, see Figs. 2, 4 and 6.

The cam member 93 is mounted on a ring or annular member 97 and has its lower portion reduced for engaging in the slot 105 of the cam 92 and the upper portion is provided with a track 106 of the width of the tracks 107 and 108 of the cams 92 and 91 for engagement by the track and cam rollers. This track is flanked by flanges 90b. The cam 93 or annular member 97, rather, is provided with a stud or pin 98, see Figs. 2 and 4, which extends through and slidably engages the boss 96 and is seated against the friction plate 39 for moving the same forwardly against the pressure of the springs 46.

The cam members 91, 92 and 93 overlap to a certain extent and are spaced radially. They are closely adjacent to form a continuous cam surface, as shown in Fig. 2.

Figures 9, 10, 11:
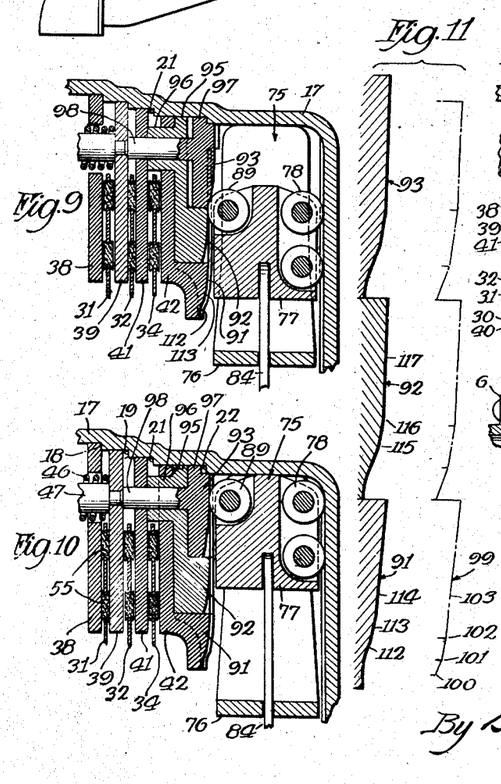
Fig. 11 is an enlarged view of the cam surfaces and the line from which they are developed, (showing in dotted lines the travel of the axis of the cutter head in forming the cam surfaces).

It is desirable that the faces of the cam members 91, 92 and 93 be of such contour as to cause a prompt clutching and declutching action in changing from one speed ratio to another during the operation of the device, in order to avoid undue friction and consequent wear on the clutch members. In Fig. 11 is shown the contour of these cams and at the right thereof is shown the contour line 99 described by the axis of the cutterhead in forming the cam surfaces 91, 92 and 93. As shown in the line 99, the contour line for the cam 91 is at three different angles; the section from the point 100 to the point 101 forming the incline surface 112 on cam 91, Fig. 11, is much more abrupt than that from 101 to 102 forming the incline surface 113, and the remainder of the line 103 forming the incline surface 114, is still more acute. The contour line for the cams 92 and 93 is very similar except that the distance between the first two points gradually increases and the angles are more acute, as shown in Fig. 11. The inner inclined surface of each cam being more or less abrupt, constitutes what might be termed a pocket or temporary stop for checking the gradual outward movement of the weight. The weight will thus be held with the roller in this pocket, that is, against its abrupt inclination until the centrifugal force is such as to overcome the pressure of the springs and to move the roller along this abrupt inclination. When the roller 89 passes onto the more acute inclined surface 113 as the speed increases it will rapidly move along this surface due to the fact that the effective spring pressure tending to move the weight radially inwardly will be greatly reduced. In other words, when the weight moves onto a more acute inclined surface the effective resistance to further movement of the weight by the pressure of the spring will be somewhat decreased thereby permitting the weight to move further outward. Further, additional increase in the velocity of the weights will materially increase the centrifugal force which in turn tends to further overcome the pressure of the springs. This decrease in the effective force of the springs to resisting centrifugal action is repeated when the weight moves onto the more acute inclined surface 114. As a result, when the weight leaves the pocket on one cam, it immediately moves along the cam and into the pocket of the next cam. The parts are so constructed that when the roller 89 passes along the inclined surface 113, the clutch is set and further movement will merely further compress the springs and more firmly set the clutch. In each speed, the clutch plate which functions as an abutment for the cam pressure, being spring pressed, will yield to prevent excessive pressure by the camming action of the weight as it moves along the outward portion of the cams, respectively. The angles for these cam surfaces will depend on the size and intended speeds of the weights, their distance from the axis of rotation, the number and capacity of the springs, the amount of friction, and the like. It will thus be seen that by means of this arrangement, the clutch is either in or it is out, there is no intermediate position which would cause undue wear on the clutch plates. When the speed reaches a predetermined amount, the roller will, as before, suddenly ride over the hump or vertex 115 of the cam 92 and along the adjacent incline surface for setting the clutch and thence over the vertex 116 onto the inclined surface 117 to the position shown in Fig. 9 for more firmly setting the clutch for intermediate speed. High speed ratio is obtained in like manner when the speed of the drive shaft is increased by the roller riding over the humps on the cam surface 93. On decrease of speed, when the centrifugal force of the weight is overcome by the spring pressure, the roller 89 will run inward along the outermost inclined surface on the cam and when it reaches the intermediate or more abrupt inclined surface of the cam, it will move rapidly over this for releasing the clutch. It will continue its rapid movement over the innermost inclined surface of the cam to the next cam surface due to the increase in the efficiency of the springs when the rollers engage the more abruptly inclined cam surface.

It will be noted that only the springs 52 are compressed when the mechanism is in low; that the springs 52 and 48 are compressed when the mechanism is in intermediate; and that all the springs are compressed when the mechanism is in high. By means of this arrangement, the increase in centrifugal force due to increase in speed is to a certain extent, compensated for. For, even assuming that the driving shaft remains at a constant velocity while the cam roller is traveling outwardly along the acute inclined cam surface of the clutch members, the velocity of the weights will increase as the radius and since centrifugal force increases as the square of the velocity, it follows that this force is materially increased as the weights move outward. This additional spring pressure will compensate for the increase in this force.

In the operation of the device, when the engine is first started, the two sections of the weight will move together and will start from the position shown in Fig. 3. When the centrifugal force is such as to cause the weights to ride over the angle or stop 101 formed by the inclined surfaces 112 and 113 on the inner part of the cam surface 91, the friction plate 42 will suddenly be forced inwardly by the roller 89 engaging the cam surface 113 against the friction disk 34 and clamp the same against the friction plate 41, thereby rotating the sleeve 35, and through the gears 63, 64, 57 and 56 rotate the drive shaft 25. The weights will now occupy the position shown in Fig. 8 with the arms of the outer weight section 76 engaging the casing 17. The centrifugal force now is such that both sections are no longer required. The inner section 77 will pass onto the cam 92 and suddenly force the friction plate 41 forwardly which will release the friction disk 34 and immediately thereafter will clamp the friction disk 32 against the spring-pressed friction plate 39 for turning the sleeve 33 and driving the driven shaft 25 through the gears 61, 62, 57 and 56. While cam roller 89 is moving from the position shown in Fig. 8 onto the cam 92, the cam 91 is being held forwardly by the track rollers 89a and 89b engaging the track 108 until the cam 92 is forced forwardly against the plate 42 after which the cam member 92 will hold the plate 42 forwardly as shown in Figs. 9 and 10. This arrangement insures a continuous track for the track rollers 89a and 89b on their return and also sets the parts in position for changing the speed ratio when the speed of the drive shaft decreases. The provision of these arms 94 or extension on track 108 insures smooth operation of the cams and roller and prevents the cam, say 91, from snapping back against the next cam 92 when the roller passes from cam 91 to 92, see Fig. 8. A further increase of speed will likewise cause the weight section 77 to engage the cam 93 and suddenly force the same forwardly, which, through the studs 98, will force the friction plate 39 forwardly for releasing the friction disk 32 and for clamping the friction disk 31 against the spring-pressed plate 38 for driving the driven shaft direct or in high, as shown in Figs. 2 and 10.

Figures 1, 7:
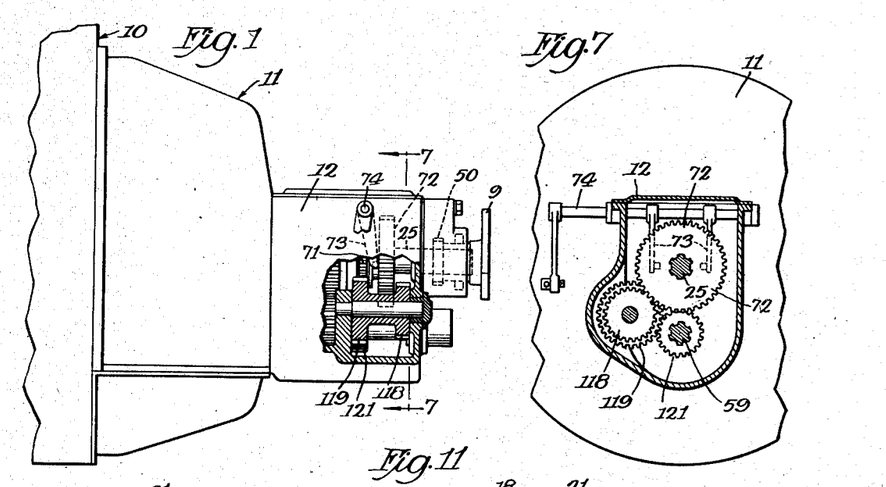
Fig. 1 is a side elevation of a portion of a vehicle with the invention in position therein and with parts broken away and parts omitted for the sake of clearness.
Fig. 7 is a section on the line 7—7 of Fig. 1.

Suitable gearing is also provided for reversing the direction of movement of the driven shaft 25. This is of the conventional type as shown in Figs. 1, 2, and 7 of the drawings. As shown, the gear 72, on the driven shaft section 25, is adapted to be moved by suitable means to mesh with a gear 118, Figs. 1 and 7, which is rigidly connected with a gear 119 which in turn is in mesh with a gear 121 on the shaft 59 whereby when said shaft 59 is operated through either the gear 61 or 63, the same will cause the driven shaft 25 to turn in a reverse direction.

It will thus be seen that since each driven clutch disk is clamped between two adjacent driving clutch plates in driving and since each of the intermediate driving plates cooperates with an adjacent clutch disk on one side to drive at one speed ratio and with an adjacent clutch disk at the opposite side to drive at another speed ratio, it is impossible for any intermediate clutch plate to engage two driven clutch disks simultaneously. In other words, when the speed is increasing it is impossible to set the clutch for intermediate without first releasing the clutch for low and likewise for each of the other speed ratios.

By providing an abrupt angle on the cam, the cam roller will be retained in a fixed position until the speed of the drive shaft reaches a predetermined amount. Then by having the adjacent portion of the cam track at a more acute angle, the roller will rapidly traverse the same whereby the clutch for that speed is suddenly and positively released immediately prior to the setting of the clutch for the next higher or lower speed ratio as the case may be, whereby the change from one speed ratio to another is positive, prompt and effective.

It will also be noted that the entire mechanism may be mounted in the conventional housing, and casing for the conventional flywheel assembly and change gear mechanism.

All of these are considered important features of the invention.

It is thought from the foregoing taken in connection with the accompanying drawings that the construction and operation of our device will be apparent to those skilled in the art and that changes in size, shape, proportion and details of construction may be made without departing from the spirit and scope of the appended claims.

We claim as our invention:

1. In a change speed device, a driving shaft, a sectional driven shaft, change speed mechanism between said shafts, said mechanism comprising a pair of concentric sleeves on a section of said driven shaft, a gear on said section on each sleeve, a friction disk on said section and on each of said sleeves, a countershaft, a cluster of gears on said countershaft in permanent engagement with said gears, a plurality of friction plates movable with said driving shaft, speed controlled means for causing one of said disks to be clamped between two of said friction plates for driving said driven shaft at one speed ratio and for causing the release of the last-mentioned disk and another of said disks to be clamped between two of said plates for driving said driven shaft at another speed ratio, and for causing still another of said disks to be clamped between two of said plates to drive said driven shaft at a third speed ratio.

2. In a change speed device, a drive shaft, a driven shaft, clutch plates movable with said drive shaft, a plurality of auxiliary driven shafts, a friction disk on each driven shaft, a gear on each driven shaft, a cluster of gears in permanent mesh with the gears on said driven shafts, a clutch disk on each of said driven shafts, speed controlled means including cam mechanism for causing said friction plates to frictionally engage said disks successively, only one of said disks at a time, as the shaft reaches predetermined speeds for driving said first-named driven shaft at a plurality of predetermined speed ratios.

3. In a motor vehicle, a change speed device comprising driving and driven shafts, a plurality of clutch members for driving said driven shaft at different speed ratios from said driving shaft, said clutch members including a plurality of clutch plates, a set of springs for each plate, means for operating certain of said plates and one set of springs for low speed ratio, and for operating additional sets for intermediate and high speed ratios and for releasing the clutch members for obtaining one gear ratio prior to the operation of another set for obtaining another gear ratio.

4. In a change speed device, a drive shaft, a driven shaft, change speed mechanism between said shafts, said mechanism comprising spring pressed friction plates carried by said driving shaft and friction disks carried by said driven shaft, and mechanism including means for clamping one of said disks between the first and second plate for driving said driven shaft in low speed and for clamping another of said disks between the second and third friction plates without further movement of the first plate for driving the driven shaft at intermediate speed and for clamping still another of said disks between the third and fourth of said plates without further movement of the first and second plates for operating said driven shaft at the same speed as said driving shaft.

5. In a motor vehicle, a drive shaft, a driven shaft, change speed mechanism for driving said driven shaft from said driving shaft at a plurality of speed ratios, said mechanism comprising a fly-wheel housing having a plurality of progressively decreasing annular shoulders thereon, a friction plate for each shoulder movable with said housing, a plurality of springs for urging said plates toward said shoulders, a plurality of radially alined cams carried by said plates, each of said cams having a plurality of inclined faces, the inclination of the innermost face of each cam being abrupt, friction disks intercalated in said friction plates for operating said driven shaft, and radially movable weights having rollers engaging said cam surfaces for operating said friction disks for driving said driven shaft from said driving shaft at progressively greater speed ratios when said driving shaft exceeds certain predetermined speeds.

6. In a motor vehicle, a drive shaft, a main sectional driven shaft, a plurality of auxiliary driven shafts, a countershaft, a cluster of gears keyed to said countershaft, gears on said main and auxiliary shafts in permanent mesh with the gear cluster, an overrunning clutch for the gear on said main shaft, a friction disk on each of said main and driven shafts, a plurality of spring pressed friction plates intercalated in said disks and movable with said drive shaft, and speed sensitive means for clamping one of said disks between the two rearmost of said friction plates when the speed reaches a predetermined amount, and for releasing said disk and clamping another of said disks between the second and third plates when said speed reaches a second predetermined amount and for releasing the last-named disk and for clamping another of said disks between the third and fourth plates when the drive shaft reaches another increased predetermined speed.

7. In a change speed device for use in motor vehicles, a driving shaft, a driven shaft, change speed means, including clutch elements and control mechanism, for driving said shafts at relatively different speeds, said mechanism comprising a plurality of cam members carried by certain of said elements and having cam surfaces, and centrifugally operated means engaging said surfaces for operating the corresponding clutch elements for driving said driven shaft at a predetermined speed ratio from said driving shaft, each of said cam surfaces having portions arranged at different angles whereby when the speed of said last-named means reaches a predetermined speed of rotation the same will move outwardly by centrifugal force to substantially instantaneously change the speed ratios of said shafts.

8. In a change speed device for use in motor vehicles, a driving shaft, a driven shaft, change speed means, including clutch elements and control mechanism, for driving said shafts at relatively different speeds, said mechanism comprising a plurality of cam surfaces connected to certain of said elements, and centrifugally operated means adapted to engage said surfaces for operating the cooperating clutch elements for changing the speed ratios of said shafts, the inner portion of each of said cam surfaces having a steep angular portion merging into a moderate angular portion whereby said last-named means will be retained in position against said steep angular portion until said centrifugally operated means reaches a predetermined speed and will then promptly operate the next adjacent clutch elements for changing the speed ratios of said shafts.

9. In a motor vehicle, a driving shaft, a driven shaft, change speed mechanism for automatically changing the speed ratio of said shafts, said mechanism comprising cooperating spring-pressed clutch members, certain of said members having connected therewith radially extending cam surfaces, speed operated means engaging said surfaces for operating said clutch members for driving said driven from said driving shaft, each of said surfaces having portions arranged at different angles to the radial movement of said means for causing said means to rapidly travel along said cam surface for operating certain of said clutch members for changing the speed ratios of said shafts when said means reaches certain predetermined speeds.

10. In a motor vehicle, a driving shaft, a driven shaft, change speed mechanism between said shafts for changing the speed ratio thereof, said mechanism comprising a plurality of spring-pressed clutch plates rotatable with said drive shaft, a plurality of clutch disks intercalated with said plates, cam members having cam surfaces carried by certain of said plates, radially movable weights having antifriction rollers thereon for engaging said cam surfaces, said surfaces having their inner portions formed at a steep angle, their intermediate portion at a much less acute angle and their outer portions at a still less acute angle whereby when said weights reach a predetermined speed they will promptly pass from one cam onto the next adjacent one, and means when one of said cam members is depressed for retaining all cam members depressed that are inwardly thereof.

11. In a change speed mechanism for use on motor vehicles, a drive shaft, a drum rotatable with said shaft, said drum having a plurality of shoulders on the inside thereof, a plurality of friction plates, one for each shoulder, rotatable with said drum and movable axially thereof, a set of springs for each plate for seating the same against a corresponding shoulder, a friction disk between each two adjacent friction plates, a shaft section connected with each disk and rotatable therewith, a driven shaft, means for driving said driven shaft selectively from said shaft sections, said means comprising a gear on each shaft section, an overrunning clutch between one only of said gears and its corresponding shaft section, a countershaft, pinions fixed on said countershaft permanently in mesh with said gears, and means for shifting said plates for selectively clamping a disk between two adjacent plates to the exclusion of the remaining disk for operating said driven shaft from said driving shaft at different gear ratios.

12. In a change speed device for use in motor vehicles, a driving shaft, a driven shaft, change speed means, including control mechanism, for driving said driven shaft from said driving shaft at different relative speeds, said mechanism comprising gears, centrifugally operated weight members, intercalated friction disks and spring pressed clutch members, and cooperating cam surfaces and cam engaging means for changing the gear ratio between said shafts, said cam surfaces having a portion arranged at a steep angle and other portions at a more acute angle, each of said steep angles preventing the centrifugal movement of said weight member until the driving shaft reaches a predetermined velocity and when it reaches said velocity, the weight will suddenly be moved outwardly by centrifugal force to operate said clutch members for promptly changing the speed ratios of said gears.

13. In a change speed device for motor vehicles and the like, a driving shaft, a driven shaft, change speed mechanism for driving said driven shaft from said driving shaft at a plurality of different speed ratios, said mechanism comprising a plurality of clutch plates rotatable with said driving shaft, a plurality of friction disks for frictionally engaging said plates, a separate gear rotatable with each disk, gearing between each of said gears and said driven shaft for driving said driven shaft from any of said gears, means controlled by the speed of the driving shaft for causing the first and second of said plates to clamp one of said disks between them for causing said disk and driven shaft to rotate at one speed ratio, means for causing a second disk to be clamped between said second and third plates by releasing said first plate for causing said second disk and driven shaft to rotate at another speed ratio, and means for causing a third disk to be clamped between a third and fourth of said plates by releasing the second plate for causing said third disk and driven shaft to rotate at a still different speed ratio.

14. In a change speed device for motor vehicles and the like, a driving shaft, a driven shaft, change speed mechanism for driving said driven shaft from said driving shaft at low, intermediate and high speed ratios, said mechanism comprising a plurality of friction driving elements rotatable with said driving shaft, a plurality of friction driven members intercalated with said elements, a separate gear rotatable with each driven member, gearing between each of said gears and said driven shaft, and speed actuated means for causing frictional engagement of certain of said elements and members for operating said driven shaft at low speed ratio for causing the release of said last-named member and the engagement of a second member with a second and third element as the speed of said driving shaft increases for operating said driven shaft at intermediate speed ratio and for releasing said last-named member as the speed of said driving shaft is further increased and for causing a third member to be frictionally engaged by a third and fourth element for driving said driven shaft at high speed ratio.

15. In a change speed device, a driving shaft, a driven shaft, change speed mechanism between said shafts, and means controlled by the speed of said driving shaft for operating certain portions of said mechanism progressively for obtaining a progressively lower gear ratio between said driving and driven shafts as the speed of said driving shaft increases, said means comprising sectional weights movable together by centrifugal force during the initial movement of said shaft, and means for limiting the movement of one weight section before the other weight section reaches the limit of its movement when the speed of said driving shaft exceeds a predetermined amount.

16. In a change speed mechanism a driving shaft, a fly wheel thereon, a driven shaft, change speed mechanism, including clutch members, for driving said driven shaft from said driving shaft at a plurality of speed ratios, centrifugally operated means for operating said clutch members, said means comprising sectional weights slidably mounted on said fly wheel for movement outwardly together by centrifugal force during their initial rotation and having their sections movably connected together, and means for limiting the sliding movement of one section when the speed of said fly wheel exceeds a predetermined amount.

17. In a change speed device, a driving shaft, a driven shaft, automatic change speed mechanism for driving said driven from said driving shaft, said mechanism comprising a plurality of nested shafts, a clutch disk for each nested shaft, a gear for each of said nested shafts, transmission gearing between each of said nested shafts and said driven shaft, clutch plates movable with said driving shaft for engaging said clutch disks, said plates and disks being intercalated, and means controlled by the speed of said driving shaft for causing one of said clutch plates to clamp one of said disks against the adjacent plate on the other side of said disk for obtaining one gear ratio, for causing said adjacent plate to release said last-named disk when the speed of said drive shaft increases for clamping an adjacent disk against a contiguous plate for causing said driving and driven shafts to rotate together at the same speed, only one of said disks being clamped for any of said speeds.

18. In a motor vehicle, a conventional fly wheel housing, a conventional casing for change speed mechanism, drive and driven shafts, a fly wheel assembly within said housing, change speed mechanism within said casing, said assembly including a fly wheel member, friction clutch mechanism and speed sensitive means for operating said clutch mechanism, said change speed mechanism comprising a plurality of gears permanently in mesh, an overrunning clutch associated with said gears, said clutch mechanism comprising clutch plates movable with said drive shaft and intercalated friction disks associated with said driven shaft, and speed controlled means for causing the first and second of said plates to clamp the first of said disks for obtaining low speed for said vehicle and on increase of speed of said drive shaft will cause the second and third of said plates to clamp the second disk and release the first disk for operating said motor vehicle at intermediate speed and on further increase in speed of said drive shaft will cause the third and fourth of said plates to clamp the third disk and release the second disk for operating said driven shaft at the same speed as said drive shaft.

19. In an automatic change speed device, a drive shaft, a driven shaft, change speed mechanism between said shafts, means including a plurality of friction clutch plates movable with said drive shaft and a plurality of friction clutch disks for cooperating with said clutch plates for driving said driven shaft at different speed ratios, springs for each of said plates for holding the same in inoperative position, and means including centrifugally operated members for operating said clutch plates against said springs, said means being so arranged that as the speed of the drive shaft increases more of said springs will be compressed without increasing the number of clutch disks clamped between said plates for obtaining low, intermediate and high speed ratios between said driving and driven shafts.

20. In a motor vehicle, a drive shaft, a driven shaft, change speed mechanism between said shafts for changing the speed ratio of said shafts, said mechanism comprising intercalated friction plates and disks, means for normally resiliently forcing all of said plates in the same direction toward adjacent disks, means for normally holding said plates out of frictional contact with said disks, means for forcing certain of said plates toward one of said disks against the pressure of said first-named means for operating said shafts at one speed ratio, means for forcing one of said last-named plates out of engagement with said last-named disk to relieve the clutch and into engagement with the next adjacent disk to operate the next adjacent clutch members for changing further the speed ratio of said shafts, and means for forcing said last-named plate out of engagement with said last-named disk and into engagement with another of said disks for still further changing the speed ratio of said shafts.

21. In a change speed device, a driving shaft, a driven shaft, means including change speed mechanism for driving said driven shaft from said driving shaft at least at three different speed ratios, said means including a clutch mechanism for each speed, and speed actuated means for actuating said clutch mechanism progressively as the speed of said driving shaft increases from zero to a maximum, and means for causing the release of the remainder of said clutch mechanism during the operation of any one of them.

22. In a change speed device, a driving shaft, a driven shaft, mechanism for driving said driven shaft from said driving shaft at a plurality of speed ratios, said mechanism comprising gears permanently in mesh, two sets of intercalated friction plates associated with said driving and driven shafts, respectively, centrifugal weight means movable outwardly from the axis of said driving shaft by centrifugal force when the speed of said driving shaft exceeds a predetermined amount, and cooperating cam surfaces and cam engaging surfaces carried by said weight and one set of said plates, certain of said surfaces having a portion arranged at a steep angle and contiguous portions at a more acute angle, each of said steep angles preventing the centrifugal movement of said weight member until the driving shaft reaches a predetermined velocity and when it reaches said velocity the weight will suddenly be moved outwardly to operate said clutch members for promptly changing the speed ratios of said gears.

23. In a change speed device, a drive shaft, a driven shaft, mechanism including a clutch for driving said driven shaft from said drive shaft, said clutch comprising a plurality of friction plates movable with said drive shaft, a plurality of driven disks associated with said driven shaft and intercalated with said plates, and means including centrifugally operated weight means, co-operating cams and cam engaging members for automatically operating said clutch for obtaining a change in the speed ratio of said shafts when the speed of said drive shaft exceeds a predetermined amount, each of said cams having a cam surface with portions arranged at different angles, the innermost angular portion being more abrupt than the remaining portion but at an inclination to the radial movement of said weight means whereby when said weight means reaches a predetermined velocity, the same will move promptly outwardly to cause the operation of said clutch to suddenly change the speed ratios of said shafts.

24. In a change speed device, a driving shaft, a driven shaft, change speed mechanism between said shafts, said mechanism comprising two sets of intercalated friction members, one set of said members connected to said driving member, a plurality of gears, each friction member of the other set being connected to, and rotatable with, a separate gear, for obtaining different speed ratios, speed controlled means for causing the operation of said friction members, said means comprising a plurality of radially movable weights rotatable with said driving shaft and movable outwardly together by centrifugal force during their initial movement, each weight comprising two parts slidably connected together, and means for limiting the radial movement of one of the parts upon the rotation of said drive shaft while the other part continues to move outwardly on further increase in speed of rotation of said driving shaft.

25. In a change speed device for use on motor vehicles and the like, a driving shaft, a driven shaft, change speed mechanism including clutch members between said shafts, a plurality of sets of two-part weights rotatable with one of said shafts and movable outwardly by centrifugal force during the rotation of said driving shaft for operating said clutch members, each set of weights comprising two parts connected and movable together under centrifugal force during their initial rotation, and means for causing a relative movement of said weights when the speed of said drive shaft exceeds a predetermined amount.

26. In a change speed device for motor vehicles, a driving shaft, a driven shaft, means including a clutch and gear mechanism for driving said driven shaft from said driving shaft, said clutch comprising a plurality of driving plates movable with said driving shaft and a plurality of driven plates intercalated with said driving plates and associated with said driven shaft, a housing for said clutch, shoulders within said housing, a plurality of sets of springs for yieldingly holding said driving plates against said shoulders, cam means carried by each of said plates, each cam means having an inclined cam surface, said cam surfaces forming continuous paths, the inner end of each of which is provided with an abrupt shoulder forming a stop, centrifugal weights movable with said casing and having antifriction rollers engaging said cam surfaces and adapted to engage said stops for preventing said weights from moving radially outwardly until a predetermined speed of said weights has been attained whereupon said weights will promptly move outwardly the full length of said engaged cam surface for forcing a driving plate into engagement with a driven plate against the compression of the corresponding springs for driving said driven shaft at a predetermined gear ratio, said springs, through said cams and inclined surfaces, forcing said weights inwardly when the speed of said driving shaft decreases to a predetermined amount.

27. In a change speed device, a driving shaft, a driven shaft, change speed mechanism including a clutch and cooperating permanently meshed gears for operating said driven shaft from said driving shaft at a plurality of gear ratios, a centrifugally operated weight for operating said clutch, said clutch comprising driving plates rotatable with said driving shaft, driven plates operable by said driving plates, cooperating cam means and cam engaging faces carried by said weight and driving plates, said faces being adapted to be successively engaged by said cam means as the speed of said driving shaft increases, each of said faces having a shoulder forming a stop for said cam means and an acute angular surface beyond said stop, whereby when the rotation of said weight reaches a predetermined speed, said cam means will suddenly pass over said shoulder and along said inclined surface into engagement with the next adjacent shoulder for forcing one of said driving plates into frictional contact with one of said driven plates for causing the same to rotate at a predetermined gear ratio.

28. In a change speed device for motor vehicles, a driving shaft, a driven shaft, change speed mechanism including cooperating clutch and gears for driving said driven shaft from said driving shaft at a plurality of different gear ratios, a housing having annular shoulders therein for enclosing said clutch, said clutch comprising driving clutch plates, low, high and intermediate driven clutch plates intercalated with said driving clutch plates, a driving clutch plate normally seated against each of said shoulders, springs for holding said plates against said shoulders, a cam member carried by each driving plate, said cam members having cam faces arranged radially of said casing and forming a continuous path, each of said cam faces having a shoulder forming a stop and an inclined portion beyond said stop, means for securing said high driven clutch plate to said driven shaft, intermediate and low speed shafts secured to said intermediate and low speed driven clutch plates, respectively, gearing of different gear ratios between said intermediate and low speed driven shafts and said driving shaft, respectively, centrifugally operated weight means engaging said cam faces successively as the speed of said driving shaft increases, means associated with said driving plates for causing the intermediate driving clutch plates to successively frictionally engage first one driven plate for one speed for the driven shaft and then frictionally engaging the next adjacent driving clutch plate and releasing the previously engaged one as the speed of said driven shaft increases for driving said driven shaft at a different speed ratio, and means for holding the cam members radially inwardly of said weight means depressed during the operation of said power shaft whereby the cam surfaces will be traversed by said weight means for changing the speed ratios of said driving and driven shafts on deceleration of said driving shaft.

JOSEPH M. HALL.
HERBERT E. TUCKER.